United States Patent [19]
Kilmer et al.

[11] Patent Number: 6,127,656
[45] Date of Patent: *Oct. 3, 2000

[54] PORTABLE ELECTRIC DESOLDERING TOOL

[75] Inventors: Paul R. Kilmer, Leroy, Mich.; Paul Louis Urban, Cheraw, S.C.

[73] Assignee: Cooper Industries, Inc., Houston, Tex.

[*] Notice: This patent is subject to a terminal disclaimer.

[21] Appl. No.: 09/289,988

[22] Filed: Apr. 13, 1999

Related U.S. Application Data

[63] Continuation-in-part of application No. 08/926,801, Sep. 10, 1997, Pat. No. 5,893,992, and a continuation-in-part of application No. 09/100,976, Jun. 22, 1998.

[51] Int. Cl.$^7$ ...................................................... H05B 11/00
[52] U.S. Cl. .......................... 219/227; 219/230; 228/20.5
[58] Field of Search ..................................... 219/227, 330, 219/229, 231, 236, 237; 228/264, 31, 20.5

[56] References Cited

U.S. PATENT DOCUMENTS 5,893,992   4/1999   Kilmer ..................................... 219/227

Primary Examiner—Teresa Walberg
Assistant Examiner—Vinod D Patel
Attorney, Agent, or Firm—Coats & Bennett, P.L.L.C.

[57] ABSTRACT

A portable electric soldering tool includes a housing forming a handle and a power head. A heating rod with a main and a secondary heating coil extends from the power head, the rod having an axial bore with a stainless steel lining to prevent solder from building up in the heating rod. A pump draws molten solder through the axial bore of the heating rod. A disposable solder collecting cartridge is removably mounted in the power head to collect solder drawn through the heating rod. The cartridge includes a barrel formed of a heat resistant plastic. Sealing gaskets are disposed at the open ends of the barrel, and a solder accumulator is disposed in the barrel to collect molten solder. The main and secondary heating coils are connected to a power switch. An electric motor for the pump is connected in series with the secondary heating coil. A selector switch energizes alternatively the main heating coil or the secondary heating coil and motor.

21 Claims, 7 Drawing Sheets

PORTABLE ELECTRIC DESOLDERING TOOL

This is a continuation-in-part of commonly owned U.S. Applications Ser. Nos. 08/926,801 and 09/100,976.

The present invention is directed to a tool for removing solder from electrical components, such as chips or other components mounted to printed circuit boards. More particularly, the invention is directed to a portable tool for heating and removing solder.

The present invention provides a hand-held, self-contained electric desoldering tool that advantageously includes heating means and vacuum means in a single, easily manipulated device.

More particularly, the present invention relates to a desoldering tool having a pistol-shaped casing or housing with a handle portion and a power head portion. The power head portion contains a vacuum pump, preferably a diaphragm pump driven by a DC motor, and heating means including a heating rod. The heating rod includes an axial bore extending from an exposed heating tip to an opposite exit end disposed in a solder collecting cartridge. The vacuum pump is in communication with the solder collecting cartridge and axial bore to draw a flow through the bore into the cartridge.

According to the invention, the solder collecting cartridge is a disposable unit removably mounted in the power head of the tool. The cartridge includes a barrel formed of a heat resistant plastic material, which is preferably translucent to allow viewing an interior of the barrel. An entry end of the barrel has a sealing gasket to mate with the heating rod. An opposite end of the barrel includes a filter. A solder accumulator, preferably a wafer having a curved or bent profile, is disposed in the barrel to provide a structure on which the solder can strike and solidify. The wafer helps prevent solder from collecting on the filter, which extends the life of the filter, and accordingly, extends the time between cartridge changes, which reduces expense and downtime.

The cartridge is mounted on a spool that includes an air passage to connect the cartridge to the vacuum pump. The spool includes a head on which the rear end of the barrel is mounted. O-rings on the head seal the head in the barrel to prevent air leakage. The cartridge and spool insert at the rear of the power head, and are releasably secured to the tool by a latch. The latch includes a blind hole that carries the spool. A spring in the hole biases the spool and cartridge in a forward direction.

According to the invention, the air conduit formed in the head of the spool includes an axial cavity that leads to a hole at a neck portion of the spool. The hole can be formed as a cross hole extending across the neck to open on both sides of the neck, or a single hole. The head and neck of the spool are supported in the tool by a cuff in a pump cap. The pump cap includes an inlet port for the pump.

The neck of the spool has a reduced diameter relative to the head of the spool. The neck and an inner wall of the cuff define an annular chamber connecting the hole to the inlet port of the pump. Thus, the hole need not be precisely aligned with the inlet port to allow air to flow to the pump.

The neck of the spool is sealed in the cuff of the pump cap by o-rings disposed in grooves in the head and body of the spool on opposite sides of the neck.

The heating rod is supported by an outer tube and an inner tube structure mounted in and extending from the power head of the housing. The outer tube is formed of a metal, for example, stainless steel, and forms an outermost barrel-like projection. The inner tube is disposed coaxially within the outer tube and has a narrower first section, a wider second section, and a frustoconical section joining the first and second sections.

According to the invention, the heating rod is mounted in the narrower first section of the heater tube with a tip extending forward through an open first end of the inner tube and a tail extending rearward into the second section. The cartridge is disposed in the wider second section with the front end of the barrel abutting the frustoconical middle section to form a seal. The rearward end of the heating rod extends into the barrel.

The heating rod is heated by a heater that surrounds a portion of the first section of the heater tube. According to the invention, the heater consists of two coils in parallel circuits. According to a preferred embodiment, a main coil is made of a positive high temperature coefficient wire that heats rapidly after being energized to quickly heat the heating rod to operating temperature. A secondary coil is connected in series with a motor for the vacuum pump. The secondary coil is energized to heat the heating rod when the motor is turned on to maintain the temperature of the heating rod when the pump is activated. In addition to heating the heating rod, the secondary coil acts as a resistance in a circuit to allow a smaller voltage motor for the vacuum pump.

According to another aspect of the invention, the desoldering tool includes a main power switch that controls power into the unit and a selector switch to energize either the main coil or the motor and secondary coil. By activating the vacuum only as needed, excessive cooling of the heating rod by the vacuum air drawn through the axial bore is avoided. The heating rod thus more consistently remains at a suitable temperature for melting solder.

According to a preferred embodiment, the vacuum pump is a diaphragm pump driven by a DC motor. The pump and the motor are mounted in the power head of the housing. According to the invention, the pump includes a piston having an oblong piston head, and accordingly, an oblong piston chamber. The piston head is positioned in the housing so that a width of the housing is a minimum, that is, the long axis of the oblong piston and chamber contour is aligned on an axial plane of the housing.

The pump chamber is defined by a valve block and a pump base which include valve ports and oblique stop surfaces opposite the ports. Valve flaps cover the ports and move under pressure to an open position against the oblique stop surfaces, which support the valve flaps and limit their movement to prevent excess bending of the flap hinge, thus facilitating the return to a closed position and extending the life of the flaps.

In addition, bosses are formed on the stop surfaces to limit the contact of the flaps with the surfaces. Solder flux drawn in by the pump collects on the surfaces inside the pump, including the stop surfaces. As the flux cools, it becomes tacky, and the valve flaps could adhere to the stop surfaces, preventing use of the pump afterward. The bosses prevent the flaps from sticking to the surfaces by interrupting the flat surfaces.

BRIEF DESCRIPTION OF THE DRAWINGS

The invention will be better understood by reference to the following detailed description in conjunction with the appended drawings, in which.

DETAILED DESCRIPTION

Figure 1:
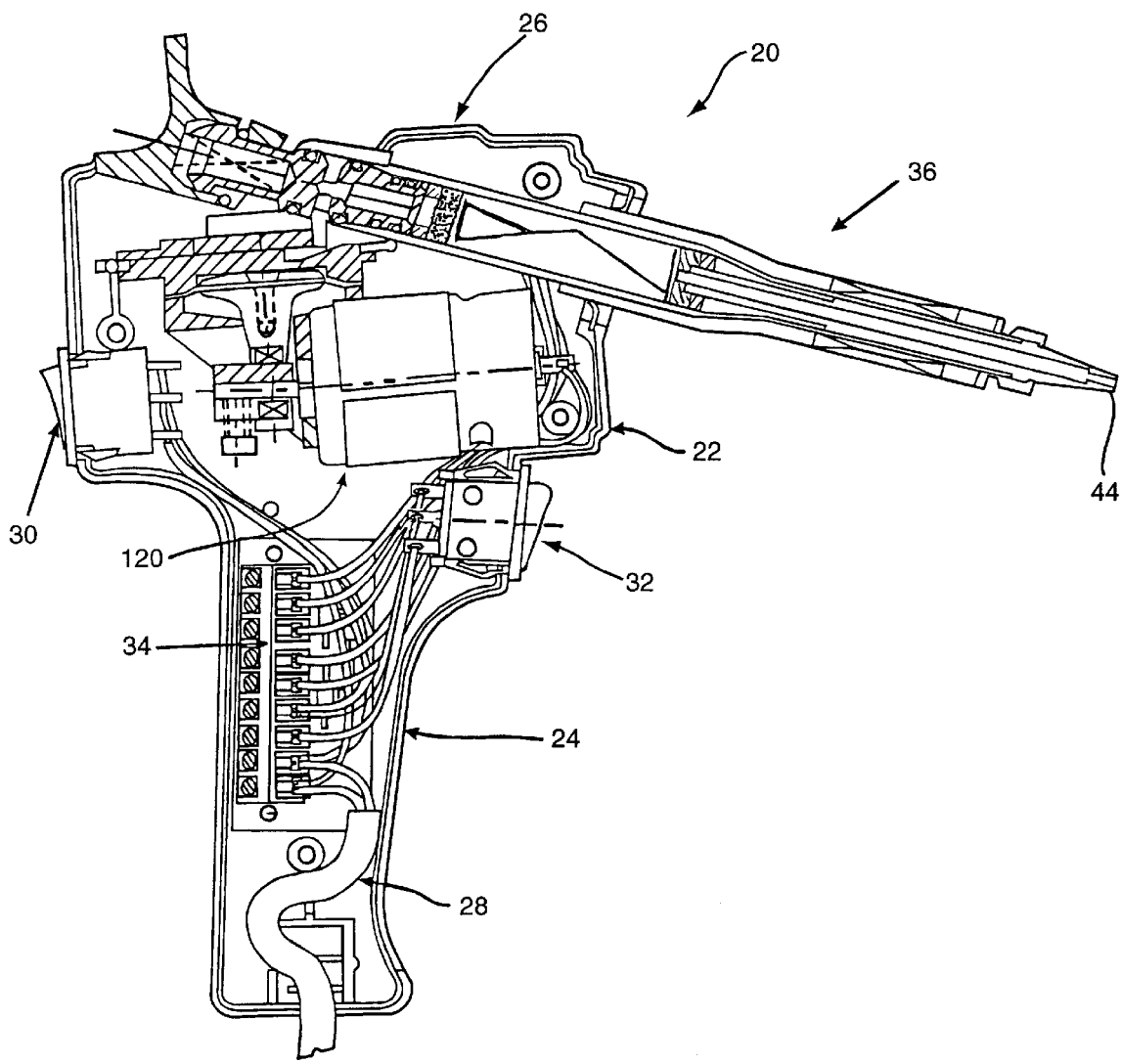
FIG. 1 is a section view of a solder removing tool in accordance with the invention.

A portable de-soldering tool 20 in accordance with the invention, illustrated in FIG. 1, includes a pistol-shaped housing 22 having a handle portion 24 and a power head portion 26. A power cord 28 connects the tool 20 to a source of power (not illustrated) by a plug (also not illustrated). The handle 24 of the tool contains a terminal block 36 for connecting the power cord 28 to the electrical components of the tool.

A main power switch 30 controls power to the tool 20, as will be explained in greater detail below. A two position switch 32 in the handle portion 24 selectively activates a main heater or a secondary heater and vacuum pump 120, described below.

A heating assembly 36 is mounted in the head portion 26 and extends in an axial direction from a forward end (corresponding to the location of a heating tip 44) to a rearward end (corresponding to the location of the power switch 30). The vacuum pump assembly 120 is also mounted in the head portion 26 and is in fluid flow communication with the heating assembly 36 to draw a vacuum at the heating tip 44 of the heating assembly. The heating assembly 36 heats solder on an electrical component, for example, at the leads connecting a chip on a printed circuit board, and the melted solder is drawn by the vacuum assembly 120 into the tool 20 through the heating tip 44.

Figure 2:
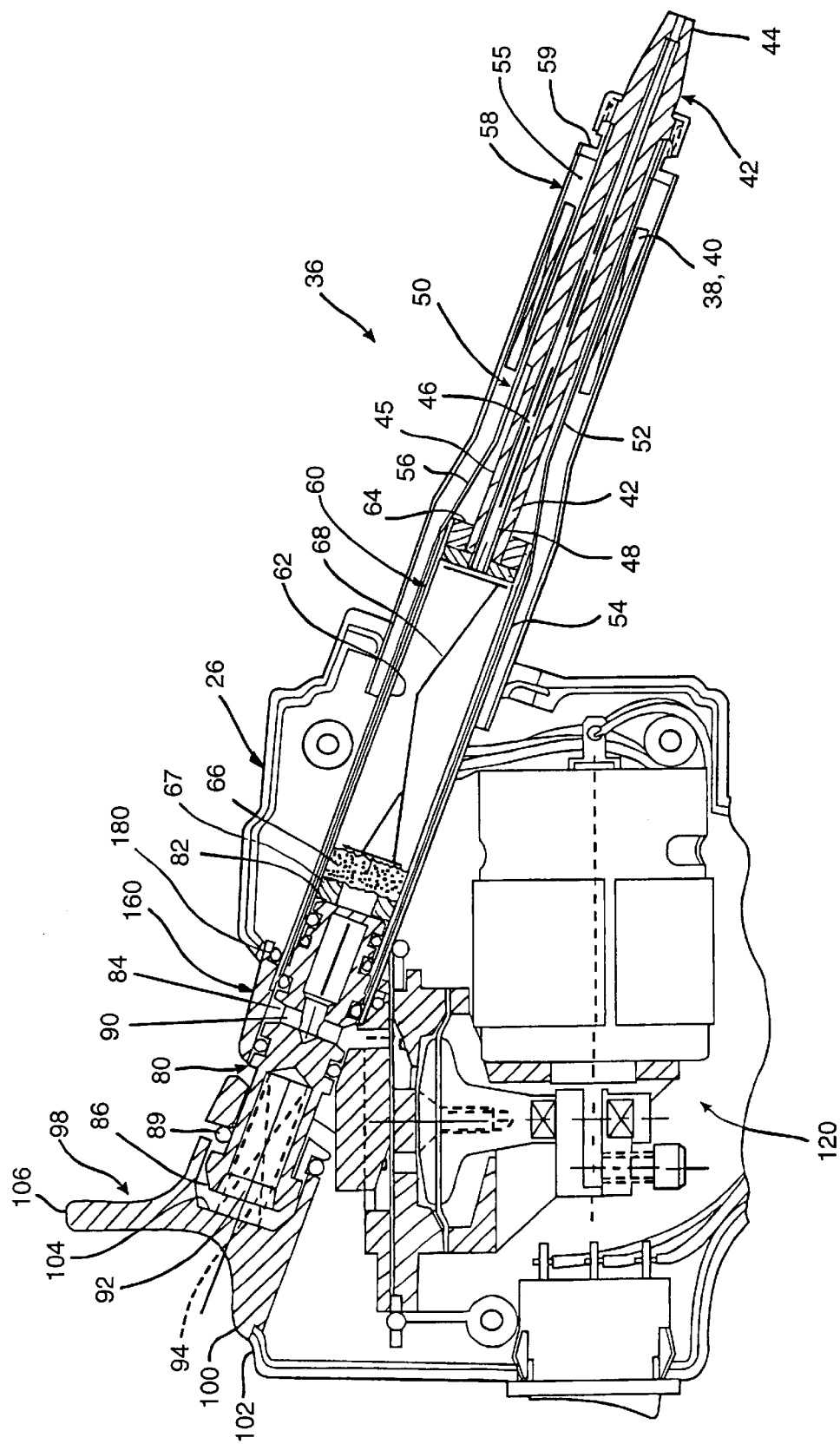
FIG. 2 is an enlarged section view of the head portion of the tool of FIG. 1 showing the heating assembly and vacuum assembly.

FIG. 2 shows an enlarged view of the head portion 26 of the tool 20. The heating assembly 36 includes heating coils 38 and 40 and a heating rod 42 mounted with the heating tip 44 extended at the forward end of the tool. The heating rod 42 is formed of a quickly heating material, preferably a metal like copper or brass, and has an axial bore 46 that extends the length of the heating rod. The bore 46 allows the vacuum pump to draw melted solder from a work piece through the heating tip 44. A sleeve 48 is disposed in the bore 46 as a lining to prevent solder from collecting in the bore, which eventually would block the passage. The sleeve 48 is preferably formed of stainless steel, which provides a low friction surface with a low affinity for solder, and may alternatively be formed of glass.

The heating rod 42 is mounted and supported by a double tube structure including an inner tube 50 and an outer tube 58. The outer tube 58 is mounted in the head portion 26 of the casing 22 coaxially with the inner tube 50, and extends forward from the casing. The outer tube 58 provides a protective cover over the inner tube 50. A plug 59 at the distal end of the outer tube 58 supports the heating rod 42 and the first section 52 of the inner tube 50 in the outer tube, and seals an annular space 55 between the outer tube 58 and inner tube 50 to prevent the inflow of air. A rear end of the outer tube 58 is supported by the casing 22. The outer tube 58 is preferably formed of a corrosion resistant material such as stainless steel. The annular space 55 between the inner tube 50 and the outer tube 58 can be filled with a material, for example, a ceramic, to insulate the outer tube 58 from the inner tube 50.

The inner tube 50 includes a first cylindrical section 52, a second cylindrical section 54 having a diameter greater than a diameter of the first section, and a frustoconical midsection 56 joining the first section and second section. The heating rod 42 is disposed in the first section 52 and closely fits the first section. The heating rod tip 44 projects outwardly from the first section 52 of the inner tube 50, and a tail, or proximal end 45 of the heating rod extends rearward through the frustoconical section 56 and into the larger second section 54. The inner tube 50 is preferably formed of a corrosion resistant material, such as stainless steel.

The second or rear section 54 of the inner tube 50 is supported in a cuff 162 of a pump cap 160, described below.

Heating coils 38, 40 for transferring heat energy to the heating rod 42 are disposed in the outer tube 58 in the annular space 55 between the inner tube 50 and the outer tube. The heating coils 38, 40 surround a portion of the first section 52 of the inner tube 50 where the heating rod 42 is supported.

According to a preferred embodiment, the heating coils 38, 40 are a main coil 38 and a secondary coil 40. The main coil 38 is formed of a positive, high temperature coefficient wire, for example, a Balco (brand) wire available from Amax Specialty Metals Corporation, for quickly heating the heating rod 42 to operating temperature when the desoldering tool is powered up. Conveniently, wires connecting the main heating coil 38 to the terminal block 34 are routed through the annular space 55 between the outer tube 58 and the inner tube 50. The main coil 38 is energized by appropriately positioning the selector switch 32.

The secondary coil 40 is also wound around the first section 52 of the inner tube 50. The secondary coil 40 is connected in a circuit in series with the vacuum pump 120, and the secondary coil and pump are energized simultaneously by positioning of the selector switch 32. The secondary coil 40 is in proximity to the main coil 38 and, along with the heating rod 42, will be heated by the main coil when the main coil is energized. The secondary coil 40 is conveniently formed of a nickel-chromium alloy as speed in heating to operating temperature is not a concern. The secondary coil 40 acts to maintain the heating rod 42 at operational temperature when the vacuum pump 120 is working, thus compensating for the cooling effect of air being drawn through the heating rod.

By appropriate selection of the capacity and resistance values of the main coil and secondary coil, the tool can be configured for use with 120 VAC or 240 VAC power sources.

Figure 3:
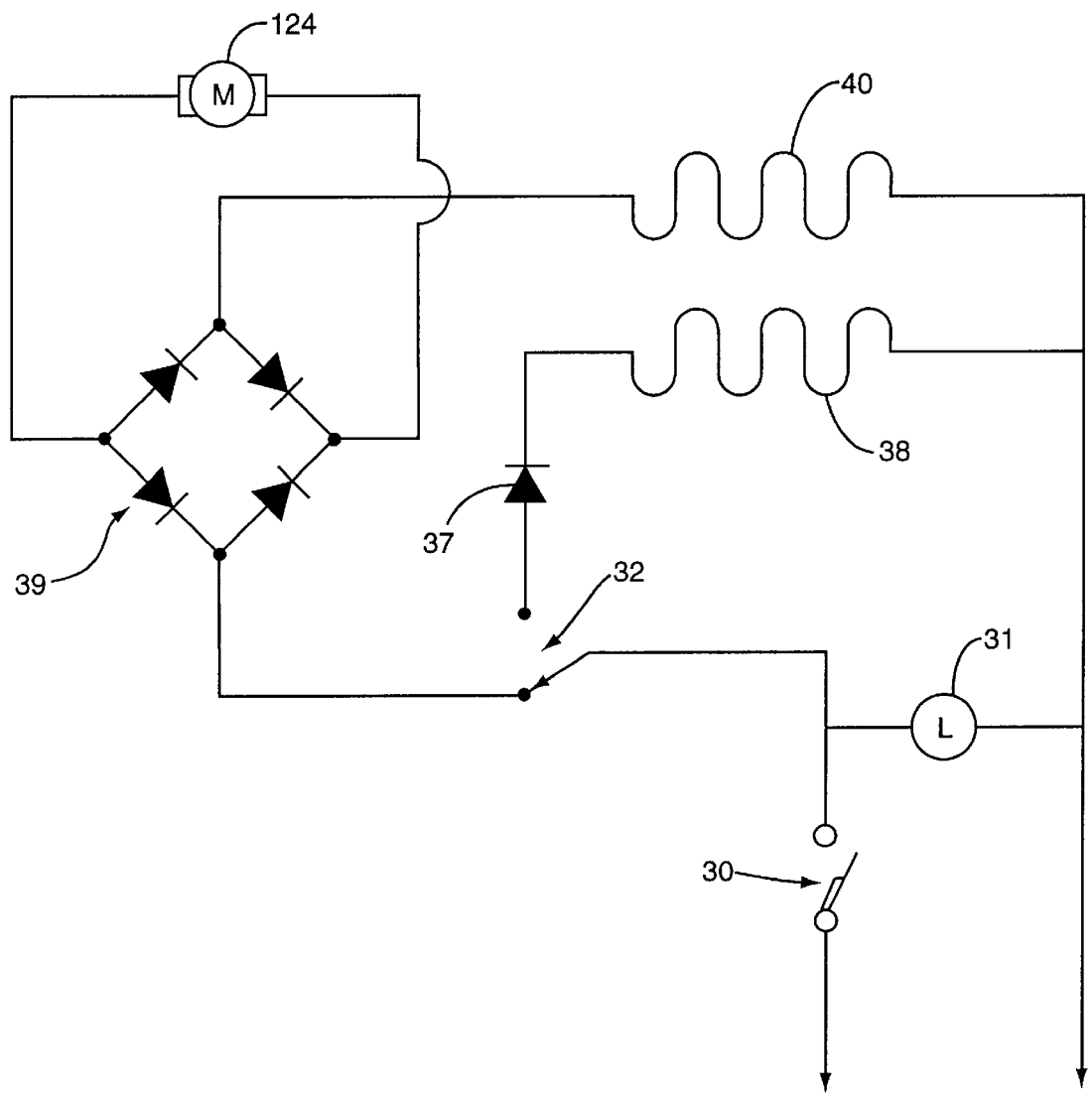
FIG. 3 is a schematic wiring diagram for the electrical heating and vacuum pump components.

The electrical circuits for the main coil 38 and secondary coil 40 are shown in FIG. 3. As mentioned, power to the tool from an external source is carried by the power cord 28 and is controlled by the main power switch 30. In the "on" position, the main switch 30 activates an indicator light 31. A two position selector switch 32 activates either a first circuit including the main coil 38, or a second circuit including the pump motor 124 and secondary coil 40. An optional half-wave rectifier 37 (used to decrease coil resistance required) provides power to the main heater coil 38. A full wave bridge rectifier 39 converts the ac power coming into the tool to dc power for the pump motor 124, which allows the use of a dc motor to drive the pump. The pump motor is connected in series to the secondary heating coil 40 so that the secondary heating coil 40 acts as a resistance in the motor circuit.

Figure 4:
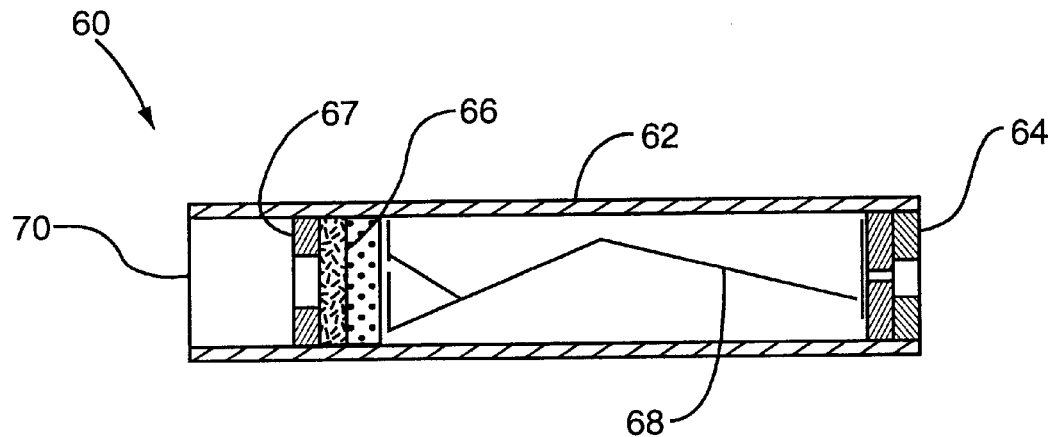
FIG. 4 is a section view of a disposable solder collecting cartridge in accordance with the invention.

Referring again to FIG. 2, solder drawn in through the bore 46 of the heating rod 42 is collected in a disposable solder collection cartridge 60 disposed in the second section 54 of the inner 50 tube. FIG. 4 shows the solder cartridge 60 in sectional view. The solder cartridge 60 includes a barrel 62 preferably formed of a temperature resistant plastic material, for example, a reinforced polyimide film, available as Kapton (brand) film from E.I. DuPont de Nemours & Co. Preferably, the barrel is translucent or transparent, which allows a view of the interior.

The solder cartridge 60 includes a front seal 64 at the entry end to engage with the heating rod 42 and sleeve 48. The front seal 64 is formed from a resilient material, such as rubber, as a disk with a counter sunk center hole in which the heating rod and sleeve are inserted. Conveniently, the seal 64 is formed from two disks, each with an appropriately sized hole, that are stacked together in the barrel 62. A rear end of the barrel 62 abuts the frustoconical section 56 of the inner tube, which helps seal the barrel against air leakage. The front seal 64 provides an additional seal against air leakage.

A filter 66, preferably formed of ceramic fiber, is positioned in the proximal end of the extraction tube to prevent solder and other contaminants from reaching the pump. A rear seal 67, shaped from a resilient material as a disk with a center hole, is disposed adjacent the filter 66 to help seal the rear end of the barrel 62 on a spool 80, described below.

A solder accumulator or wafer 68 is disposed in the barrel 62 between the front seal 64 and the filter 66 to collect and solidify the melted solder. The wafer 68 is a thin, bent or curved strip of metal sheet or foil that is interposed in a flow path of the barrel to catch molten solder carried into the barrel. Molten solder that strikes the wafer 68 immediately cools and solidifies. The wafer 68 shape is any convenient non-planar shape that provides contact surfaces in the flow pattern of the barrel 62. Because the wafer 68 collects solder that otherwise would collect on the filter 66, the wafer extends the life of the filter, and accordingly the operating time of the tool before a cartridge change is needed.

The cartridge 60 shown in FIG. 4 is disposable. The translucent barrel 62 can be inspected by the user to determine whether the filter or air passage is blocked by solidified solder, and if so, the full cartridge can be removed and replaced by a fresh cartridge.

Figure 5:
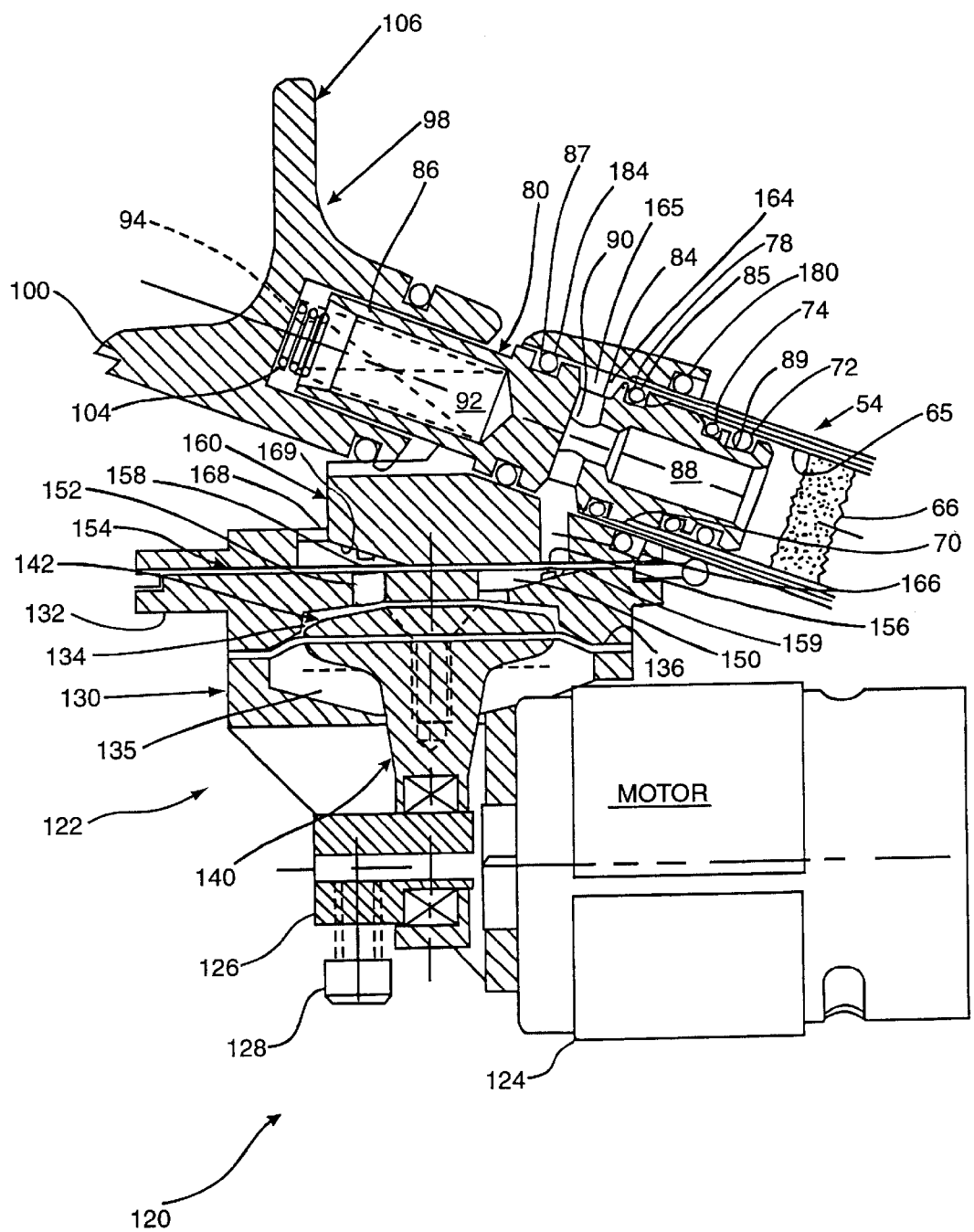
FIG. 5 is an enlarged section view showing the pump assembly of the tool and mounting assembly for the solder collecting cartridge.

FIG. 5 illustrates a rear portion of the power head 26 enlarged for clarity and removed from the housing 22. The disposable cartridge 60 is mounted on a spool 80 which positions the cartridge in the tool. The spool 80 is inserted into the rear portion 54 of the inner tube 50 and closes off the rear end of the inner tube.

Figure 6:
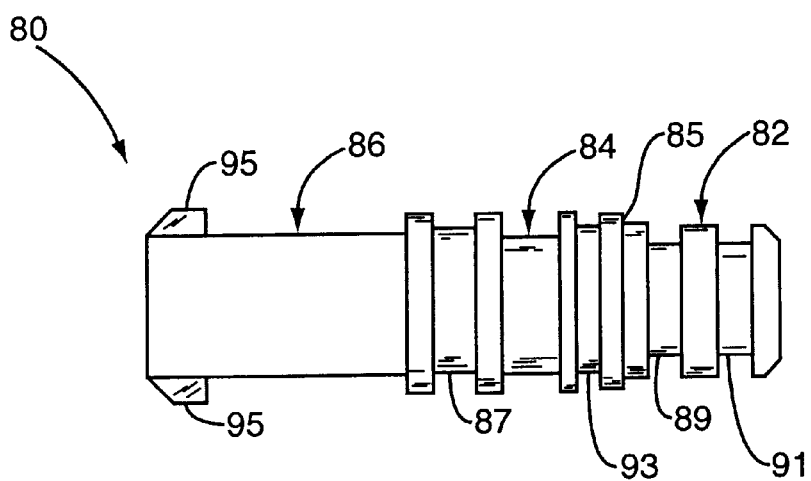
FIG. 6 is a side view of a spool for mounting the solder collecting cartridge in the tool.

Referring also to FIG. 6 in which the spool 80 is shown separately and rotated 90° from the orientation of FIG. 5, the spool 80 is a generally cylindrically shaped plug having a head 82, a neck 84 with a reduced diameter, and a body 86. The spool 80 is formed of a plastic material, rubber, or another resilient air-impervious material. The head 82 is inserted in the cartridge barrel 62 and abuts the rear seal 67. A shoulder 85 formed on the head 82 abuts a rear edge 70 of the barrel 62. The head 82 includes parallel grooves 89, 91 in which o-rings 72, 74 are disposed. The o-rings 72, 74 seal against the inner surface 65 of the barrel 62 to prevent air leakage.

The head 82 also includes a groove 93 adjacent to the neck 84 in which an o-ring 78 is disposed. The o-ring 78 seals against the inner surface of the inner tube 50 to help prevent air leakage into the cartridge 60.

An axial hole 88 formed in the head 82 communicates with the interior of the barrel 62 to provide a pathway for air drawn by the vacuum pump 120. The axial hole 88 leads to a cross hole 90 in the neck 84 that extends laterally in opposite directions from the axial hole. The cross hole 90 opens on the outer surface of the neck 84 to allow air to pass from the spool 80. The cross hole 90 extends across the neck 84 to open on opposite sides of the neck. Alternatively, a simple hole extending from the axial hole to one side of the neck 84 can be used.

The body 86 of the spool 80 extends rearward from the head 82, and includes an axially directed recess 92. Tabs 95 project laterally from the outer surface of the end of the body 86.

Referring again to FIG. 5, a latch 98 supports the spool 80 and cartridge 60 in the tool. The latch 98 holds the spool 80 and cartridge 60 in place in the inner tube 50, and provides an easy means for removing the assembly for maintenance. The body 86 of the spool 80 is inserted in a cavity 104 in the latch 98. A spring 94 is disposed in the recess 92 in the spool body 86 and acts against a latch 98 to bias the spool 80 in a forward direction. The cavity 104 in the latch 98 contains and positions the spring 94 that acts on the spool 80. The latch 98 includes groove in which an elastic retaining ring 96 is disposed. The ring 96 protrudes through slots in the groove (not shown in FIG. 5) to trap the tabs 95 in the cavity 104.

The latch 98, spool 80, and cartridge 60 are inserted into an opening in the housing 22 (FIG. 2) to mount the cartridge. The latch 98 is attached to the housing 22 by a lip 100 that catches on a latching edge 102 of the housing. The latch 98 is removed by pushing the latch 98 forward (toward the tip 44), and lifting a lever 106 away from the housing to release the lip 100 from the latching edge 102. The latch 98 can then be withdrawn from the housing 22, which allows access to the spool 80 and the solder cartridge 60 for removing and replacing the cartridge.

Referring to FIG. 5, the vacuum means 120 includes a pump 122 and a motor 124 to drive the pump. The pump 122 includes a pump base 130 and a valve block 132 fastened together with a diaphragm 136 between. The pump base 130 and the valve block 132 have facing recesses defining, with the diaphragm, an upper piston chamber 134 and a lower piston chamber 135.

A piston 140 is fastened to the diaphragm by a connecting cap 142. The piston 140 is connected to the motor 124 by an eccentrically rotating shaft 126, which produces reciprocating movement of the piston 140 in the upper 134 and lower 135 piston chambers, which in turn causes movement of the diaphragm 136. A counterbalance 128, preferably a screw with an appropriately sized screw head, is threadedly fastened to the shaft 126. The length of the screw and the size of the head selected to properly balance the movement of the piston 140.

Figure 7:
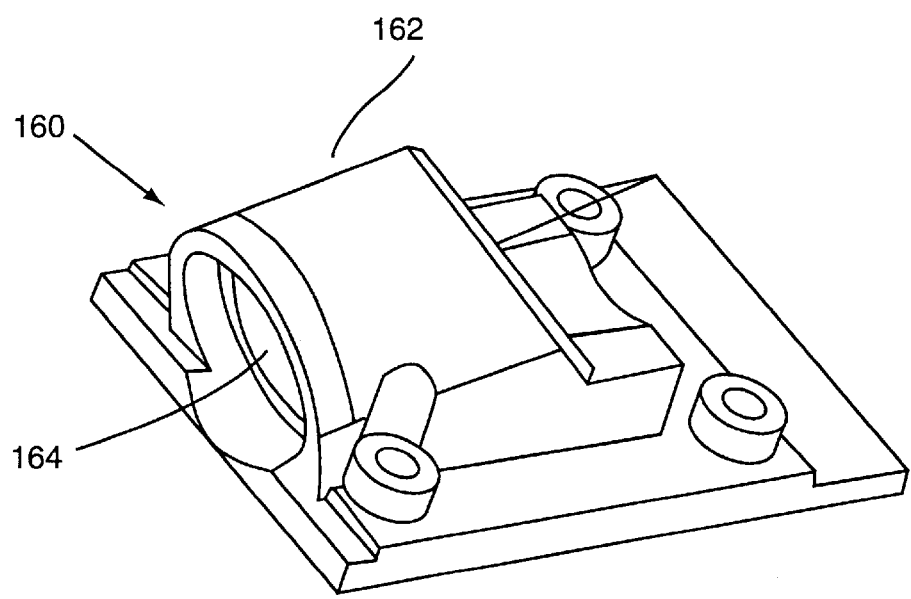
FIG. 7 is a perspective view of a pump cap.
Figure 10:
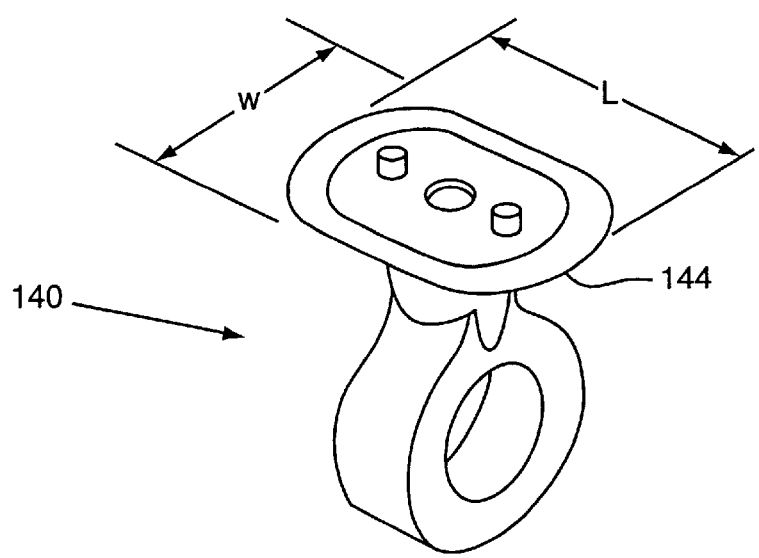
FIG. 10 is a perspective view of a pump piston having an oblong head.
Figure 8:
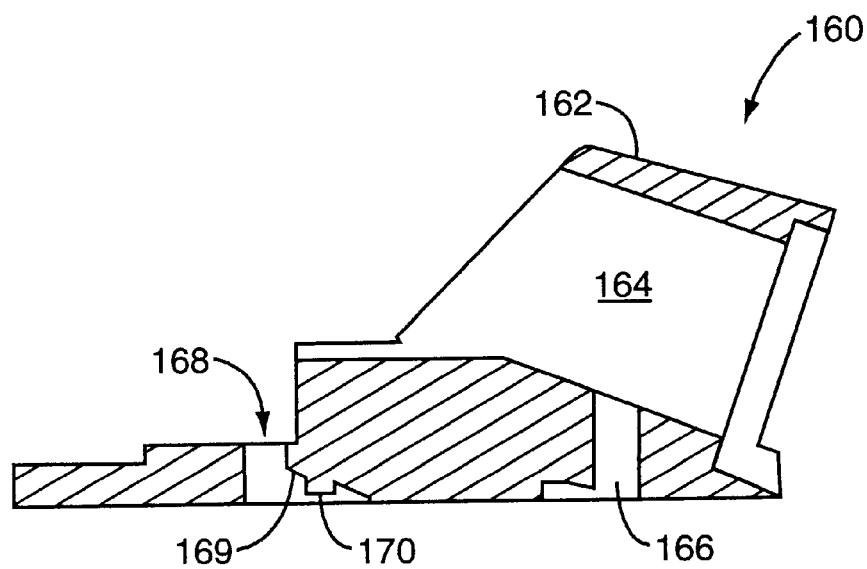
FIG. 8 is a section side view of the pump cap of FIG. 7.

A pump cap 160, illustrated in FIG. 7 and FIG. 8, covers an upper side of the valve body 132 and provides a connection between the valve body and the spool 80. The pump cap 160 includes a cuff 162 having a central passage 164 in which the spool 80 is inserted. The neck portion 84 and adjoining portions of the head 82 and body 86 of the spool 80 are disposed in the central passage 164.

Figure 9:
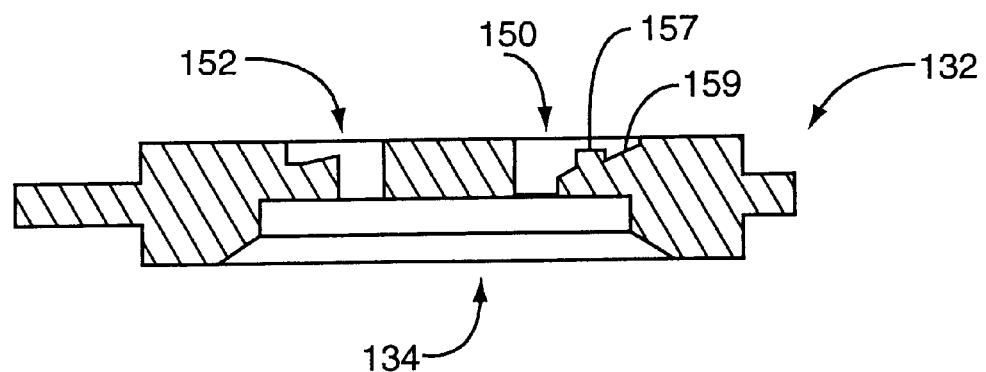
FIG. 9 is a section view of a pump head plate.

The valve body 132, illustrated in FIG. 9, includes an inlet port 150 and an outlet port 152. A valve diaphragm 154 covers the inlet port 150 and the outlet port 152, and includes an inlet flap 156 and an outlet flap 158 respectively positioned on the inlet port 150 and outlet port 152. The pump cap 160 includes an inlet passage 166 leading from the cylindrical passage 164 to the inlet port 150 of the valve body 132, and an outlet passage 168 leading from the outlet port 152 to outside the pump.

As may be understood by reference to FIG. 5, the inlet flap 156 opens by moving into the valve block 132 as the pump diaphragm 136 is moved downward and closes against a valve seat formed at the inlet passage 166 by the pump cap 160 when the pump diaphragm moves upward. Conversely, the outlet flap 158 opens by moving upward into the outlet passage 168 of the pump cap 160 when the pump diaphragm moves upward and is closes against a seat formed at the outlet port 152 by the valve block 132.

The inlet port 150 is formed with a stop wall 159 and boss 157 arranged obliquely to the valve diaphragm 154 to provide a stop limit for the inlet valve flap 156. The outlet passage 168 in the pump cap 160 is also formed with a stop wall 169 and boss 170 oriented obliquely to the valve diaphragm. The stop walls 159, 169 prevent excessive bending of the inlet valve flap 156 and outlet valve flap 158 in their respective open positions, which allows the flaps to respond better to close the ports, and prolongs the life of the flaps. The bosses 157, 170 prevent the valve flaps 156, 158 from adhering to the stop walls because of flux deposits on the stop walls. The flux deposits can cause the valve flaps to adhere when the unit cools. The bosses insure that after the unit is turned off, or the pump is not in use (that is, no hot air passing through the pump), the valve flaps will remain free to move.

Between the neck 84 of the spool 80 and the inner wall 164 of the cylindrical passage, an annular chamber 165 is formed which connects the cross hole 90 in the spool 80 with the inlet passage 166 in the pump cap 160. The cross hole 90 delivers air to the annular chamber 165 which can then flow to the inlet passage 166. The annular chamber 165 eliminates the need to precisely align the cross hole 90 or alternative single hole with the inlet passage 166 which simplifies assembly.

The inner tube 50 is inserted in the cuff 162 and is sealed by an o-ring 180 seated in a counterbore in the cuff entrance. In addition, the body 86 of the spool 80 is sealed in the cylindrical passage 164 by a third o-ring 184 disposed in a groove 87 in the body.

The pump includes features advantageous to the tool 20 according to the invention. The pump piston 140, illustrated in FIG. 5, has an oblong piston head 144, with a first axis L longer than a second perpendicular axis W. "Oblong" is intended to mean a non-circular closed curve, including elliptical, oval, and other similar shapes. The piston head 144 is positioned so that the long axis L is aligned in the longitudinal direction of the tool 20, running from the heating tip 44 to the main switch 30 (shown in FIG. 1) and the second axis W is aligned in the transverse direction. The shape of the piston head 144 facilitates mounting the pump in the power head 26 of the tool 20, and advantageously allows the tool housing 22 to have a narrower profile. An additional advantage is that the locations of the inlet port 150 and outlet port 152 in the valve block 132 are in better alignment, which improves the efficiency of the pump. In addition, the rocking motion of the piston 140 caused by the eccentrically rotating shaft 126 coincides with the shorter axis W, which facilitates balancing the piston.

The invention has been described in terms of preferred principles, structure and steps, however, those of skill in the art will appreciate that the invention may be practiced other than as described and substitutions and equivalents may be used without departing from the scope of the invention as defined in the following claims.

What we claim is:

1. A portable electric desoldering tool, comprising:

a portable housing;

a heating rod supported in the housing with a heating tip extending from a distal end thereof, the heating rod having an axial through bore;

a disposable solder collection cartridge including a barrel with a front end and a rear end;

mounting means for removably mounting the cartridge in the housing with a tail end of the heating rod communicating with the front end of the barrel; and vacuum means mounted in the housing and connected to the rear end of the barrel to create a vacuum for drawing a flow of melted solder through the axial bore into the cartridge.

2. The desoldering tool as claimed in claim 1, wherein the barrel is formed of a heat resistant plastic and the cartridge further comprises a filter disposed at the rear end of the barrel, a sealing gasket with a hole disposed at the front end of the barrel with the tail end of the heating rod extending into the hole, and a solder accumulator disposed in the barrel between the filter and the gasket.

3. The desoldering tool as claimed in claim 1, wherein said mounting means comprises a spool having a head with an elongated, axial passage leading from an end of the head to a neck, the neck having a cross-hole extending laterally outward, the head being releasably inserted in the rear end of the barrel, the passage and cross-hole providing a flow path to the vacuum means.

4. The desoldering tool as claimed in claim 3, further comprising a latch member releasably securable to the housing, the latch having a cavity receiving a body of the spool, and including a spring disposed in the cavity and biasing the spool away from the latch, wherein the spring biases the spool and cartridge toward the heating rod.

5. The desoldering tool as claimed in claim 4, further comprising an inner tube mounted in the housing, the inner tube having a first section, a second section with a diameter greater than the first section, and a frustoconical portion joining the first and second sections, the cartridge being mounted in the housing with the barrel disposed in the second section of the inner tube and the front end of the barrel abutting the frustoconical portion to form a seal, and the heating rod being disposed in the first section of the inner tube.

6. The desoldering tool as claimed in claim 5, further comprising:

an outer tube mounted in the housing and extending therefrom with the inner tube disposed in the outer tube; and a heating coil surrounding the inner tube and disposed in a space between the inner tube and the outer tube, wherein the heating tip is disposed coaxially in the inner tube and extends through a portion of the inner tube including said heating means.

7. The desoldering tool as claimed in claim 3, further comprising a mating collar in which the neck of the spool is disposed, the spool having o-rings mounted on the head and body adjacent to the neck, wherein the neck of the spool has a diameter smaller than a diameter of the head so that an annular chamber is defined between the neck and an interior of the collar, and wherein the vacuum means has an inlet communicating with the annular chamber.

8. The desoldering tool as claimed in claim 1, wherein said vacuum means comprises:

a diaphragm pump mounted in the power head portion and connected to pull a flow through the axial bore of the heating rod, the diaphragm pump having an inlet port and an outlet port, a valve diaphragm with an inlet flap at an inlet port and an outlet flap at an outlet port, wherein the inlet port includes a valve seat on which inlet flap rests to close the inlet port and a flap stop surface opposite and oblique to the valve seat, and wherein the outlet port includes a valve seat on which outlet flap rests to close the outlet port and a flap stop surface opposite and oblique to the valve seat, the stop surfaces each having a boss projecting therefrom toward the respective valve seat to prevent the respective flaps from resting on the stop surfaces.

9. The desoldering tool as claimed in claim 8, wherein the diaphragm pump has a piston with an oblong piston head, a long axis of the oblong piston head aligned on an axial plane of the housing.

10. The desoldering tool as claimed in claim 8, wherein the diaphragm pump includes a drive motor with an eccentrically rotating shaft and a counterbalance mounted by screw threads to the shaft.

11. The desoldering tool as claimed in claim 1, further comprising a main heating coil and a secondary heating coil, the two heating coils being connected in parallel circuits to a single power source, the secondary heating coil being connected in series to an electric pump of the vacuum means, and a selector switch for alternatively activating the main heating coil or the secondary heating coil.

12. The desoldering tool as claimed in claim 11, wherein the main heating coil is formed from a positive high temperature coefficient wire.

13. The desoldering tool as claimed in claim 11, wherein the main heating coil circuit includes a half wave rectifier to deliver power to the main heating coil.

14. The desoldering tool as claimed in claim 11, wherein the secondary heating coil and electric motor circuit includes a full wave bridge rectifier to deliver power to the motor and secondary coil.

15. A portable electric desoldering tool, comprising:

a portable housing;

an inner tube having a first section, a second section with a diameter greater than the first section, and a frusto-conical portion joining the first and second sections;

a heating rod having an axial bore supported in the first section of the inner tube with a tip extending from a distal end of the inner tube;

a disposable solder collection cartridge having a barrel with a front end and a rear end, a filter disposed in the rear end, a gasket disposed in the front end, and a solder accumulator disposed in the barrel between the filter and gasket;

mounting means for removably mounting the cartridge in the second section of the inner tube with the front end of the barrel abutting the frustoconical portion of the inner tube to form a seal and with the axial bore of the heating rod communicating with the front end of the barrel; and vacuum means mounted in the housing and connected to the rear end of the barrel to draw melted solder through the axial bore into the barrel.

16. The tool as claimed in claim 15, wherein said mounting means comprises:

a spool having a body and a head, the head releasably inserted in an exit end of the barrel, the head having an elongated, axial cavity communicating with the barrel and leading to a cross-hole extending outward therefrom at a neck, the cavity and cross-hole providing a flow path to the vacuum means;

a latch releasably securable to the housing, the latch having a cavity receiving the body of the spool; and a spring disposed in the latch cavity between the latch and the spool, wherein the spring biases the spool and cartridge against the inner tube.

17. A portable electric desoldering tool, comprising a housing having a handle and a power head;

a heating rod extending from the power head in the axial plane and having an axial bore therethrough;

a pump mounted in the power head and connected to pull a flow through the axial bore of the heating rod;

an electric motor connected to drive the diaphragm pump;

a main heating coil disposed around the heating rod;

a secondary heating coil disposed around the heating rod, the electric motor being connected in series with the secondary heating coil; and a switch for alternatively activating the main heating coil or the secondary heating coil.

18. The desoldering tool as claimed in claim 17, wherein the housing has an axial plane extending from a front to a rear of the housing, and wherein the pump is a diaphragm pump having a piston with an oblong piston head, a long axis of the oblong piston head aligned on the axial plane, the diaphragm pump having an inlet valve and an outlet valve aligned on the axial plane, wherein the diaphragm pump has a valve diaphragm with an inlet flap at an inlet port and an outlet flap at an outlet port, and wherein the inlet port includes a valve seat on which inlet flap rests to close the inlet port and a flap stop surface opposite and oblique to the valve seat, and wherein the outlet port includes a valve seat on which outlet flap rests to close the outlet port and a flap stop surface opposite and oblique to the valve seat, the flap stop surfaces each having a boss projecting therefrom toward the respective valve seat.

19. The desoldering tool as claimed in claim 17, wherein the main heating coil is formed from a positive high temperature coefficient wire.

20. The desoldering tool as claimed in claim 17, wherein the main heating coil circuit includes a half wave rectifier to deliver power to the main heating coil.

21. The desoldering tool as claimed in claim 17, wherein the secondary heating coil and electric motor circuit includes a full wave bridge rectifier to deliver power to the motor and secondary coil.

* * * * *